United States Patent [19]

Borehag

[11] 3,738,599

[45] June 12, 1973

[54] AIRCRAFT BARRIER NET

[75] Inventor: Leif Mathias Borehag, Norrkoping, Sweden

[73] Assignee: Borgs Fabricks AB, Norrkoping, Sweden

[22] Filed: Oct. 23, 1970

[21] Appl. No.: 83,438

[30] Foreign Application Priority Data

Nov. 14, 1969 Sweden............................ 15625/69

[52] U.S. Cl............................................ 244/110 C
[51] Int. Cl.............................................. B64f 1/02
[58] Field of Search............ 244/110, 110 C, 110 R, 244/110 A

[56] References Cited
UNITED STATES PATENTS 3,086,734  4/1963  Fonden et al................... 244/110 R
3,069,118  12/1962  Bernard......................... 244/110 R
3,468,500  9/1969  Carlsson......................... 244/110 C
3,622,107  11/1971  Bernard......................... 244/110 C Primary Examiner—Milton Buchler
Assistant Examiner—Paul E. Sauberer
Attorney—Munson & Fiddler

[57] ABSTRACT

An aircraft arresting means comprising a barrier net composed of horizontal bands joined by a plurality of vertical bands, the net having band ends which include loops that pass around pins forming part of a coupling to brakes to which ends of the bands are connected. The loops sliding around the pins cause adjustment of the net, when contacted by an aircraft so that a uniformly distributed load is obtained on all of the activated bands of the net.

4 Claims, 6 Drawing Figures

AIRCRAFT BARRIER NET

BACKGROUND OF THE INVENTION

It is an object of the invention to provide an aircraft arresting barrier in the form of a net which includes horizontal bands having looped end portions which are adjustable about pins or the like to enable the bands to adjust to the required extent, when contacted by an aircraft, to uniformly distribute vertical bands that extend between and connect the horizontal bands.

The present invention therefore relates to a barrier net for arresting aircraft, which barrier net has horizontal extensible bands or lines joined together by a plurality of vertical bands, the net being suspended at both ends between standards or posts or some other net-raising system, and being connected at both ends to brakes.

DESCRIPTION

The invention is illustrated in the accompanying drawings, in which an illustrative embodiment is shown and in which.

Figure 1:
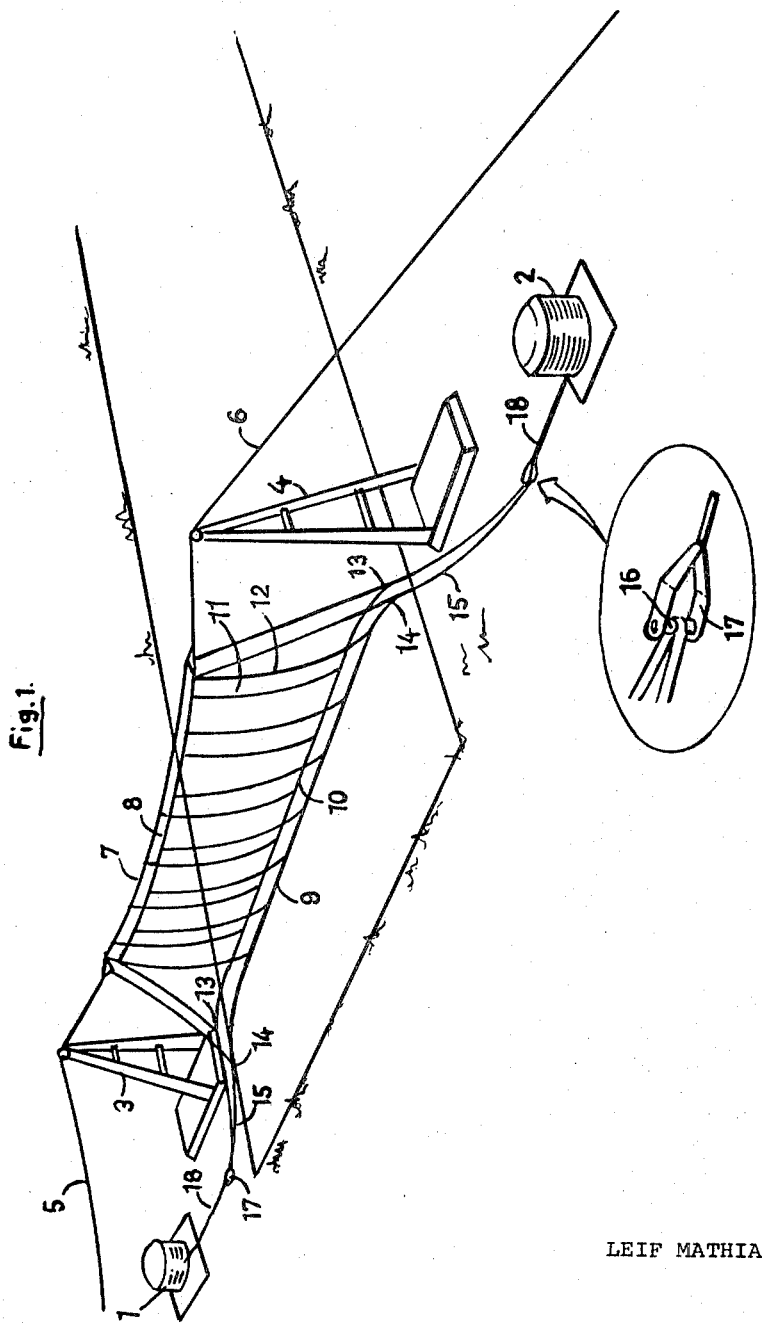
FIG. 1 is a perspective view of a raised net in aircraft-arresting position.
Figure 2:
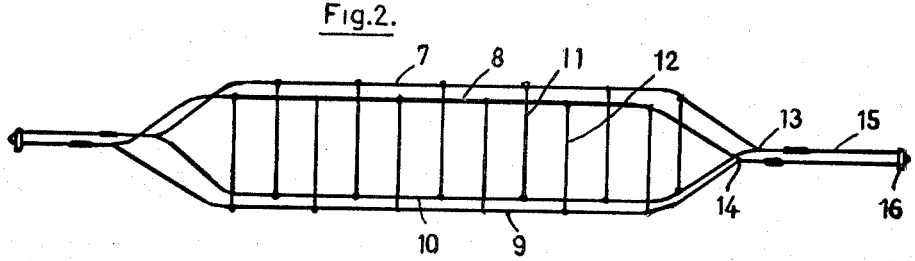
FIG. 2 is a side view of the net.

Between the two braking means 1 and 2 is shown a net, constructed according to the invention, and suspended from standards or posts 3 and 4 by means of lines 5 and 6. The net is composed of two part-net structures having horizontal longitudinal bands 7, 10 and 8, 9 joined by a plurality of vertical bands 11 and 12. The horizontal bands 7, 10 and the horizontal bands 8, 9 are joined together at the points 13 and 14 to a net loop 15, which slides around a pin 16, shown in the ellipse in FIG. 1, of a coupling 17 attached to a brake line 18.

Figure 3:
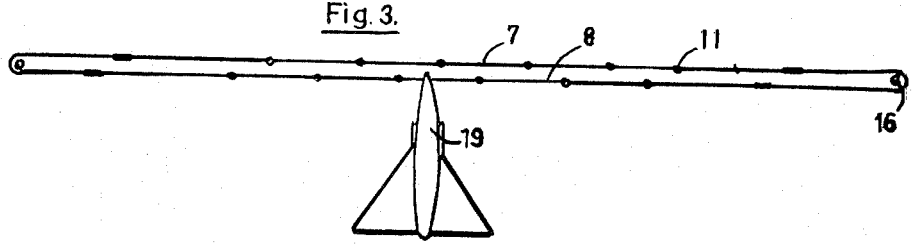
FIG. 3 is a top plan view of the net of FIG. 2.
Figure 4:
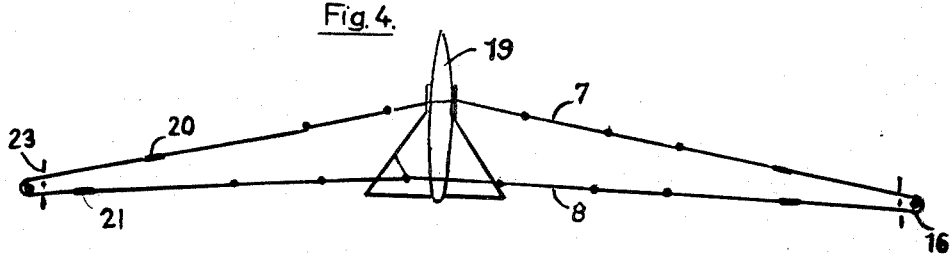
FIG. 4 is a top plan view of an aircraft contacting with the barrier.

FIG. 3 illustrates a Delta-wing aircraft 19 moving toward the barrier net, and FIG. 4 shows the aircraft crashing the barrier.

A self-centering effect of the net on the aircraft is obtained by a wedging effect produced by back swept or delta wing of the aircraft when the leading edge thereof penetrates the vertical bands 11 and 12, causing the net loops 15 to slide around the pins 16 in such a manner that the vertical bands 11 and 12 of the net arrange themselves symmetrically on respective sides of the longitudinal central axis of the aircraft. Sliding of the net loops 15 around the pins 16 as an aircraft is caught in the net causes the horizontal bands 7, 8, 9 and 10 to extend forwardly and rearwardly from portions of the loop net whereupon a uniformly distributed load is obtained on all activated vertical bands.

The band loops 15 are provided with stop means 20, 21 which cause the movement of the loop 15 to be stopped by a stop means 23 upon the failure of a horizontal band. The other portion of the net thus remains serviceable.

FIGS. 1 to 4 illustrate a net which comprises a two part net structure, but the barrier means may comprise a plurality of nets arranged parallel to one another for the purpose of obtaining a total net strength suitable for the brakes. By varying the horizontal distance between the vertical bands in respective nets of a parallel net barrier structure, uniform distribution of the load over the aircraft is obtained with integrated co-operation of the parallel nets.

Figure 5:
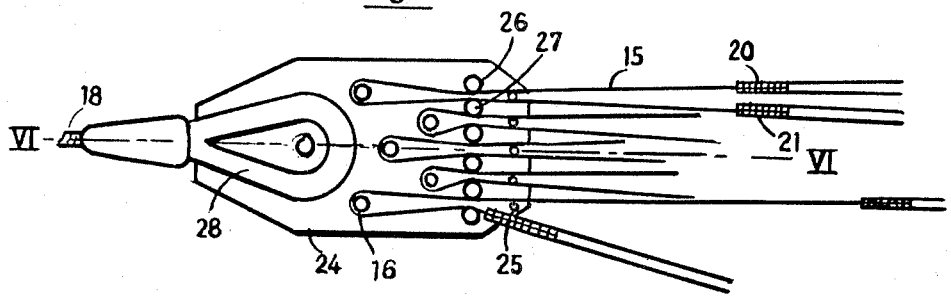
FIG. 5 is a top plan view of a coupling.
Figure 6:
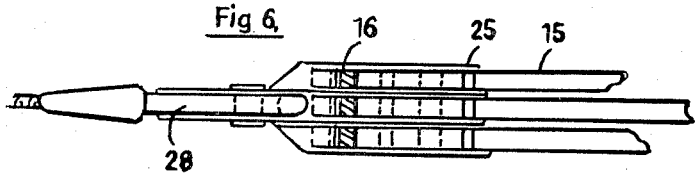
FIG. 6 is a sectional view on the line VI—VI of FIG. 5.

A coupling 24 for a plurality of band loops forming part of a parallel net structure is illustrated in FIGS. 5 and 6. The coupling 24 is attached to an eye member 28 of the brake line 18. A coupling is provided with pins 16, direction-changing rollers 25 and stop rollers 26, 27 for the stop means 20, 21. As will be seen in FIG. 5, the band loops 15 with pins, direction-changing rollers and stop rollers, are arranged horizontally parallel and, as shown in FIG. 6, in the case of a large number of nets, several parallel layers may also be arranged in superposed relationship. These and other modifications are considered as being within the scope of the invention.

What is claimed is:

1. An arresting device for delta wing aircraft comprising:
   a. two parallel nets suspended horizontally across and above the runway for successively engaging the leading edge of the aircraft wing;
   b. each of said nets comprising an upper rope member and a lower rope member spaced from one another in a horizontal plane a distance which is equal to the height of the net;
   c. the upper rope members being joined at their ends and connected to common suspension means;
   d. the upper and lower rope members of each of said nets being interconnected by means of a plurality of spaced bands extending vertically between said rope members;
   e. the upper and lower rope members of each of said nets also being connected at their ends by means of a loop member slidably engaging a coupling member;
   f. said coupling member being connected to torque absorbing means arranged at opposite sides of the runway.

2. An aircraft arresting device according to claim 1, wherein the loop members are provided with stop means for limiting the sliding movements of the loops in the coupling against a stop means.

3. An aircraft arresting device according to claim 2, wherein the coupling is provided with a direction-changing roller and a stop roller system.

4. An aircraft arresting device according to claim 3, wherein the loop members have direction-changing rollers and stop rollers arranged horizontally parallel.

* * * * *